United States Patent
Li et al.

(10) Patent No.: US 12,019,598 B2
(45) Date of Patent: Jun. 25, 2024

(54) REDUCING DATABASE MAINTENANCE EFFORT

(71) Applicant: INTERNATIONAL BUSINESS MACHINES CORPORATION, Armonk, NY (US)

(72) Inventors: Shuo Li, Beijing (CN); ShengYan Sun, Beijing (CN); Xiaobo Wang, Beijing (CN); Peng Hui Jiang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 599 days.

(21) Appl. No.: 16/752,101

(22) Filed: Jan. 24, 2020

(65) Prior Publication Data

US 2021/0232551 A1 Jul. 29, 2021

(51) Int. Cl.
*G06F 16/21* (2019.01)
*G06F 11/30* (2006.01)
*G06F 11/34* (2006.01)
*G06N 5/02* (2023.01)
*G06N 5/04* (2023.01)
*G06N 20/20* (2019.01)

(52) U.S. Cl.
CPC .......... *G06F 16/217* (2019.01); *G06F 11/302* (2013.01); *G06F 11/3428* (2013.01); *G06F 11/3452* (2013.01); *G06N 5/02* (2013.01); *G06N 5/04* (2013.01); *G06N 20/20* (2019.01)

(58) Field of Classification Search
None
See application file for complete search history.

(56) References Cited

U.S. PATENT DOCUMENTS

| | | | |
|---|---|---|---|
| 7,831,592 B2 | 11/2010 | Markl et al. | |
| 9,600,786 B2 | 3/2017 | Simitsis et al. | |
| 10,157,204 B2 | 12/2018 | Cheng et al. | |
| 10,613,899 B1* | 4/2020 | Saha | G06N 20/00 |
| 2005/0256961 A1* | 11/2005 | Alon | H04L 41/147 |
| | | | 709/229 |
| 2008/0282124 A1* | 11/2008 | Esposito | G06F 11/3676 |
| | | | 714/736 |
| 2013/0207776 A1* | 8/2013 | Christianson | G08G 1/07 |
| | | | 340/5.7 |

(Continued)

OTHER PUBLICATIONS

El-Helw et al.,"Collecting and Maintaining Just-in-Time Statistics", 2007 IEEE 23rd International Conference on Data Engineering, 2007, 10 pages.

(Continued)

*Primary Examiner* — Thu N Nguyen
(74) *Attorney, Agent, or Firm* — Lily Neff; Andrew D. Wright; Calderon Safran & Wright, P.C.

(57) ABSTRACT

Methods and systems for reducing database maintenance effort are disclosed. A method includes: collecting, by a computing device, a history of statistics for database objects; predicting, by the computing device, statistics using the history of statistics; testing, by the computing device, a workload using the predicted statistics; determining, by the computing device, at least one database object to maintain based on the testing the workload; and maintaining, by the computing device, the determined at least one database object.

18 Claims, 6 Drawing Sheets

(56) References Cited

U.S. PATENT DOCUMENTS

| | | | |
|---|---|---|---|
| 2014/0012835 A1* | 1/2014 | Cheng | G06F 16/21 |
| | | | 707/808 |
| 2014/0136571 A1* | 5/2014 | Bonvin | G06F 16/2219 |
| | | | 707/792 |
| 2015/0006440 A1* | 1/2015 | Nicholson | G06N 5/04 |
| | | | 706/11 |
| 2015/0269155 A1* | 9/2015 | Bastide | G06Q 50/01 |
| | | | 707/723 |
| 2017/0031987 A1 | 2/2017 | Desai et al. | |
| 2017/0257653 A1* | 9/2017 | Farré Guiu | H04N 21/23418 |
| 2020/0036909 A1* | 1/2020 | Caspi | H04N 5/272 |
| 2020/0042522 A1* | 2/2020 | Zait | G06F 16/221 |
| 2020/0275543 A1* | 8/2020 | Mollet | A01K 29/00 |
| 2021/0074082 A1* | 3/2021 | Bates | G07C 5/006 |

OTHER PUBLICATIONS

Zhu et al.,"Piggyback Statistics Collection for Query Optimization: Towards a Self-Maintaining Database Management System", The Computer Journal, vol. 47, No. 2, Jan. 2004, 24 pages.

* cited by examiner

400

FULLKEYCARD Summary

| Growth with similar steps | |
|---|---|
| Line Regression Score | 0.999774931803 |
| Random Forest Regression | 0.999995150707 |
| Growth with different steps | |
| Line Regression Score | 0.987945659212 |
| Random Forest Regression | 0.986142465575 |
| Growth with mix of insertions and deletions | |
| Line Regression Score | 0.995169864391 |
| Random Forest Regression | 0.999829300803 |
| Normal Random Table | |
| Line Regression Score | -0.0033369543739 |
| Random Forest Regression | -0.42075251191 |
| Periodic Random Table | |
| Line Regression Score | -0.001078032165 |
| Random Forest Regression | -0.464849194206 |
| Line Reg with suitable feature | -0.0015834151743 |
| Random Forest with feature | 0.979105154001 |

Cluster Ratio Summary

| Growth with similar steps | |
|---|---|
| Line Regression Score | 0.297197365602 |
| Random Forest Regression | 0.875055433074 |
| Growth with different steps | |
| Line Regression Score | 0.0636029815376 |
| Random Forest Regression | 0.8082366736 |
| Growth with mix of insertions and deletions | |
| Line Regression Score | 0.176920469652 |
| Random Forest Regression | 0.99256974656 |
| Normal Random Table | |
| Line Regression Score | 0.000656971015053 |
| Random Forest Regression | -0.591871818867 |
| Periodic Random Table | |
| Line Regression Score | 0.473734224268 |
| Random Forest Regression | 0.999478325921 |

FIG. 5

REDUCING DATABASE MAINTENANCE EFFORT

BACKGROUND

Aspects of the present invention generally relate to computing devices and, more particularly, to methods and systems for reducing database maintenance effort.

A relational database management system (RDBMS) such as IBM® Db2 ® (IBM and Db2 are registered trademarks of International Business Machines Corporation in the United States and/or other countries) may precompile Structured Query Language (SQL) statements and produce a database request module (DBRM) including the precompiled SQL statements. An RDBMS may then bind the DBRM into a package when an application is built. During a bind process used to create the package, an RDBMS may validate object references in the SQL statements of the application and select access paths that the RDBMS uses to access data for the program.

SUMMARY

In a first aspect of the invention, there is a computer-implemented method that includes: collecting, by a computing device, a history of statistics for database objects; predicting, by the computing device, statistics using the history of statistics; testing, by the computing device, a workload using the predicted statistics; determining, by the computing device, at least one database object to maintain based on the testing the workload; and maintaining, by the computing device, the determined at least one database object.

In another aspect of the invention, there is a computer program product, the computer program product comprising one or more computer readable storage media having program instructions collectively stored on the one or more computer readable storage media, the program instructions executable to: collect a history of statistics for database objects; predict statistics corresponding to an upcoming database maintenance window using the history of statistics; determine an updated access path of a database object using the predicted statistics; and switch an access path of the database object to the updated access path at the upcoming database maintenance window.

In another aspect of the invention, there is a system that includes: a hardware processor, a computer readable memory, and a computer readable storage medium associated with a computing device; program instructions to collect a history of statistics for database objects; program instructions to predict statistics using the history of statistics; program instructions to test a workload using the predicted statistics; program instructions to determine at least one database object to maintain based on the testing the workload; and program instructions to maintain the determined at least one database object, wherein the program instructions are stored on the computer readable storage medium for execution by the hardware processor via the computer readable memory.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 4 illustrates test results from an exemplary simulation for fullkeycard statistic prediction according to an embodiment.

FIG. 5 illustrates test results from an exemplary simulation for cluster ratio statistic prediction according to an embodiment.

DETAILED DESCRIPTION

Figure 1:
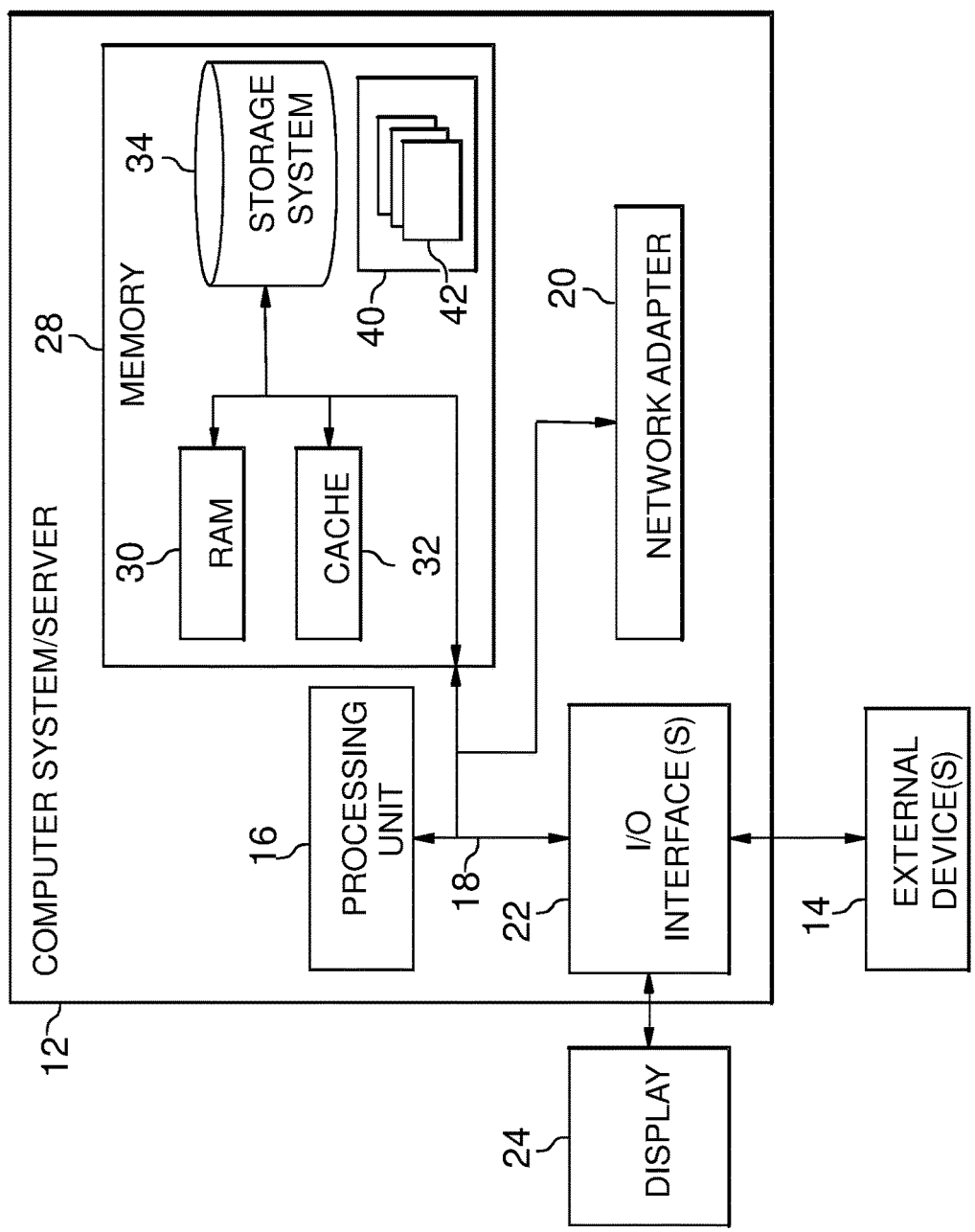
FIG. 1 depicts a computer system in accordance with aspects of the invention.

Aspects of the present invention generally relate to computing devices and, more particularly, to methods and systems for reducing database maintenance effort. As described herein, aspects of the invention include a method and system that collect statistics history for database objects, use a model to predict statistics based on the history, test a workload using the predicted statistics, determine database objects to be maintained based on the test, maintain the determined database objects based on the predicted statistics, and modify the model based on feedback regarding the predicted statistics.

In embodiments, an access path for an SQL statement specifies how an RDBMS accesses the data that a query specifies. The access path may specify indexes and tables that are accessed, access methods that are used, and an order in which objects are accessed. Database statistics (e.g., statistics describing data in the RDBMS) may be used by the RDBMS to determine the most efficient access paths during the bind process. A previously bound package may be rebound to optimize query performance if the database statistics have changed since the last binding (e.g., due to reorganization of data or other changes to data).

A database administrator may spend a significant amount of time maintaining a database. Additionally, a significant amount of computing resources in an RDBMS may be consumed by database maintenance tasks. In particular, during regular maintenance windows (e.g., daily maintenance time periods), statistics for database objects may be collected by running an RDBMS utility (e.g., RUNSTATS), and packages may be rebound to update access paths, potentially improving query performance, based on the collected statistics. The statistics collection and rebinding may be time consuming and computationally expensive.

Embodiments address these problems with an RDBMS by providing methods and systems for reducing database maintenance effort, including reducing the time required to collect statistics and bind cost. In particular, embodiments improve the functioning of a computer by providing methods and systems that collect statistics history for database objects, use a model to predict statistics based on the history, test a workload using the predicted statistics, determine database objects to be maintained based on the test, maintain the determined database objects based on the predicted statistics, and modify the model based on feedback regarding the predicted statistics. Additionally, embodiments improve the functioning of a computer by reducing a maintenance window by predicting whether RUNSTATS and BIND is valid or not for static queries and maintaining the statement cache for dynamic queries. Additionally, embodiments improve the functioning of a computer by saving database system resources by reducing RUNSTATS and BIND cost. Accordingly, through the use of rules that improve computer-related technology, implementations of the invention allow computer performance of functions not previously performable by a computer. Additionally, implementations of the invention use techniques that are, by definition, rooted in computer technology (e.g., RDBMS, SQL, and machine learning).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
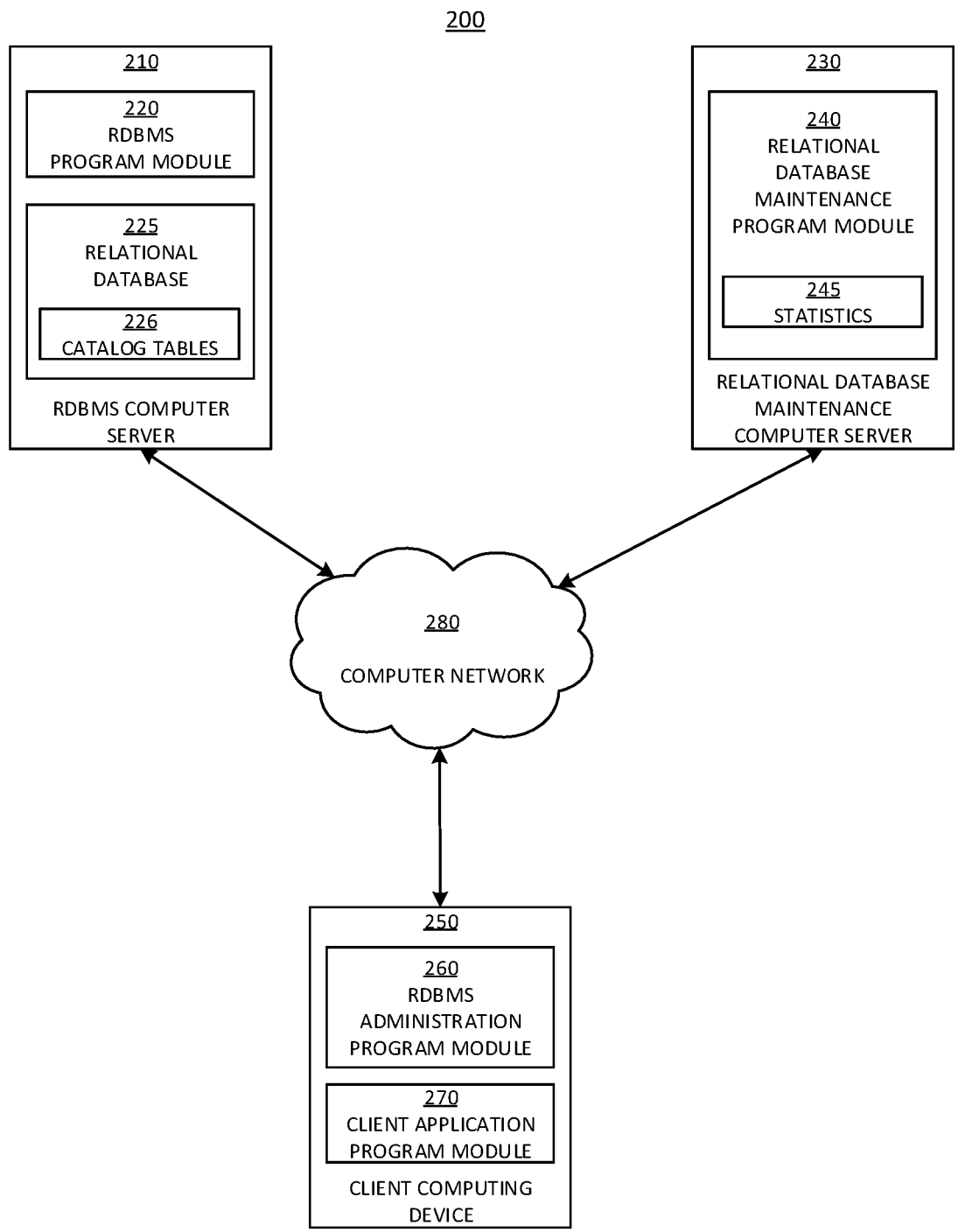
FIG. 2 depicts an illustrative environment in accordance with aspects of the invention.

FIG. 2 depicts an illustrative environment 200 in accordance with aspects of the invention. As shown, the environment 200 comprises an RDBMS computer server 210, a relational database maintenance computer server 230, and a client computing device 250 which are in communication via a computer network 280. In embodiments, the computer network 280 is any suitable network including any combination of a LAN, WAN, or the Internet. In embodiments, the RDBMS computer server 210, the relational database maintenance computer server 230, and the client computing device 250 are physically collocated, or, more typically, are situated in separate physical locations.

The quantity of devices and/or networks in the environment 200 is not limited to what is shown in FIG. 2. In practice, the environment 200 may include additional devices and/or networks; fewer devices and/or networks; different devices and/or networks; or differently arranged devices and/or networks than illustrated in FIG. 2. Also, in some implementations, one or more of the devices of the environment 200 may perform one or more functions described as being performed by another one or more of the devices of the environment 200.

In embodiments, the RDBMS computer server 210 is a computer device comprising one or more elements of the computer system/server 12 (as shown in FIG. 1). In particular, the RDBMS computer server 210 is implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, the RDBMS computer server 210 includes an RDBMS program module 220, which comprises one or more of the program modules 42 shown in FIG. 1. In embodiments, the RDBMS program module 220 includes program instructions for an RDBMS that maintains a relational database 225 that includes catalog tables 226 and that is included in the RDBMS computer server 210. In embodiments, the program instructions included in the RDBMS program module 220 of the RDBMS computer server 210 are executed by one or more hardware processors.

Still referring to FIG. 2, in embodiments, the relational database maintenance computer server 230 is a computer device comprising one or more elements of the computer system/server 12 (as shown in FIG. 1). In particular, the relational database maintenance computer server 230 is implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, the relational database maintenance computer server 230 includes a relational database maintenance program module 240, which comprises one or more of the program modules 42 shown in FIG. 1. In embodiments, the relational database maintenance program module 240 includes program instructions for maintaining the relational database 225 included in the RDBMS computer server 210. In embodiments, the relational database maintenance program module 240 receives statistics 245 from the catalog tables 226 of the relational database 225 of the RDBMS computer server 210. In embodiments, the program instructions included in the relational database maintenance program module 240 of the relational database maintenance computer server 230 are executed by one or more hardware processors.

Still referring to FIG. 2, in embodiments, the client computing device 250 is a computer device comprising one or more elements of the computer system/server 12 (as shown in FIG. 1). In embodiments, the client computing device 250 is a desktop computer, a laptop computer, a mobile device such as a cellular phone, tablet, personal digital assistant (PDA), or other computing device.

In embodiments, the client computing device 250 includes an RDBMS administration program module 260 and a client application program module 270, each of which comprises one or more of the program modules 42 shown in FIG. 1. In embodiments, the RDBMS administration program module 260 includes program instructions for a user interface for administering and managing the RDBMS computer server 210, including the RDBMS program module 220 and the relational database 225. In embodiments, the RDBMS administration program module 260 is usable in conjunction with the RDBMS program module 220 to perform various maintenance and administration tasks on the relational database 225, including collecting statistics (e.g., using a RUNSTATS command) and binding and rebinding packages (e.g., using a BIND command and a REBIND command, respectively). In embodiments, the client application program module 270 includes program instructions for a client application that accesses the relational database 225 on the RDBMS computer server 210 that is administered using the RDBMS administration program module 260. In embodiments, the program instructions included in the RDBMS administration program module 260 and the client application program module 270 of the client computing device 250 are executed by one or more hardware processors.

Figure 3:
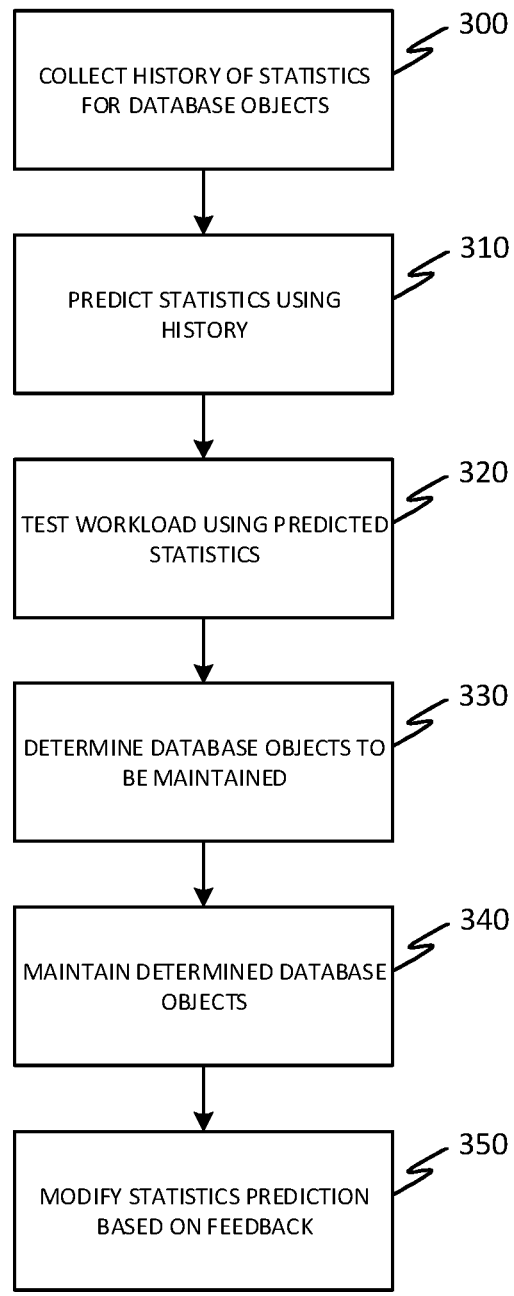
FIG. 3 depicts a flowchart of an exemplary method performed in accordance with aspects of the invention.

FIG. 3 depicts a flowchart of an exemplary method performed by the relational database maintenance program module 240 of the relational database maintenance computer server 230 in accordance with aspects of the invention. The steps of the method may be performed in the environment of FIG. 2 and are described with reference to the elements shown in FIG. 2.

At step 300, the relational database maintenance computer server 230 collects a history of statistics for database objects. In embodiments, step 300 comprises the relational database maintenance program module 240 of the relational database maintenance computer server 230 sending a request to the RDBMS program module 220 of the RDBMS computer server 210 for historical statistics describing data in the relational database 225. In response to receiving the request from the relational database maintenance program module 240, the RDBMS program module 220 retrieves the historical statistics from catalog tables 226 (e.g., a history table) in the relational database 225 and sends the historical statistics describing data in the relational database 225 to the relational database maintenance program module 240. The relational database maintenance program module 240 then receives the historical statistics as the statistics 245.

Still referring to step 300, in embodiments, the historical statistics include database statistics collected at each of a plurality of database maintenance windows (e.g., daily maintenance times). In embodiments, the historical statistics include database statistics collected each time the RDBMS program module 220 executes a command (e.g., RUNSTATS) that collects statistics for objects (e.g., tables) in the relational database 225. In embodiments, the statistics describe characteristics of tables, associated indexes, or statistical views in the relational database 225.

Still referring to FIG. 3, at step 310, the relational database maintenance computer server 230 predicts statistics using the history. In embodiments, step 310 comprises the relational database maintenance program module 240 of the relational database maintenance computer server 230 predicting the statistics for objects in the relational database 225 for the next database maintenance window (e.g., the next daily maintenance time) by applying machine learning techniques to analyze the historical statistics collected at step 300.

Still referring to step 310, in embodiments, to predict the statistics for a database object for a next database maintenance window, the relational database maintenance program module 240 determines whether a database object described by the history received at step 300 is a constant growth table or a volatile table. For constant growth tables, the relational database maintenance program module 240 determines whether the table exhibits growth with similar steps (e.g., 100 records are added each day), growth with different steps (e.g., 100 records are added on a first day, 200 records are added on a second day, etc.), or growth with a mix of insertions and deletions. For volatile (random) tables, the relational database maintenance program module 240 determines whether or not the tables exhibit periodicity. The relational database maintenance program module 240 applies machine learning techniques to analyze the history received at step 300 and test various prediction models/techniques, including line regression and random forest regression, for particular statistics, using the received history as training data. In this manner, the relational database maintenance program module 240 determines a prediction technique (e.g., line regression or random forest regression) that most accurately predicts a particular statistic (e.g., CARDF of SYSTABLES; FIRSTKEYCARDF, FULLKEYCARDF, CLUSTERRATIOF, DATAREPEATFACTORF of SYSINDEXES; CARDF of SYSCOLUMNS). In embodiments, the prediction technique may be determined based on results of a simulation, as described below with respect to FIGS. 4 and 5.

Still referring to step 310, in embodiments, for FULLKEYCARDF (index fullkeycard), in response to determining that the database object is a constant growth table with similar steps, the relational database maintenance program module 240 uses a line regression or a random forest regression to predict statistics for the database object including for the next database maintenance window, using the history received at step 300. In embodiments, for FULLKEYCARDF, in response to determining that the database object is a constant growth table with different steps, the relational database maintenance program module 240 uses a line regression or a random forest regression to predict the statistics for the database object for the next database maintenance window, using the history received at step 300. In some cases, use of the random forest regression may result in overfitting. In embodiments, for FULLKEYCARDF, in response to determining that the database object is a constant growth table with a mix of insertions and deletions, the relational database maintenance program module 240 uses a line regression or a random forest regression to predict the statistics for the database object for the next database maintenance window, using the history received at step 300.

Still referring to step 310, in embodiments, for FULLKEYCARDF, in response to determining that the database object is a volatile (random) table, the relational database maintenance program module 240 avoids predicting the statistics for the database object for the next database maintenance window, and the relational database maintenance program module 240 does not automatically maintain the database object. In embodiments, for FULLKEYCARDF, in response to determining that the database object is a volatile (random) with periodicity, the relational database maintenance program module 240 uses machine learning techniques to extract/determine a periodic feature, and a random forest regression is used to predict the statistics for the database object for the next database maintenance window, using the history received at step 300. If the relational database maintenance program module 240 is unable to extract/determine a periodic feature, then the relational database maintenance program module 240 avoids predicting the statistics for the database object for the next database maintenance window, and the relational database maintenance program module 240 does not automatically maintain the database object.

Still referring to step 310, in embodiments, for CLUSTERRATIOF (cluster ratio), in response to determining that the database object is a constant growth table with similar steps, the relational database maintenance program module 240 uses a random forest regression to predict statistics for the database object including for the next database maintenance window, using the history received at step 300. In embodiments, for CLUSTERRATIOF, in response to determining that the database object is a constant growth table with different steps, the relational database maintenance program module 240 uses a random forest regression to predict the statistics for the database object for the next database maintenance window, using the history received at step 300. In some cases, use of the random forest regression may result in overfitting. In embodiments, for CLUSTERRATIOF, in response to determining that the database object is a constant growth table with a mix of insertions and deletions, the relational database maintenance program module 240 uses a random forest regression to predict the statistics for the database object for the next database maintenance window, using the history received at step 300.

Still referring to step 310, in embodiments, for CLUSTERRATIOF, in response to determining that the database object is a volatile (random) table, the relational database maintenance program module 240 avoids predicting the statistics for the database object for the next database maintenance window, and the relational database maintenance program module 240 does not automatically maintain the database object. In embodiments, for CLUSTERRATIOF, in response to determining that the database object is a volatile (random) with periodicity, the relational database maintenance program module 240 uses machine learning techniques to extract/determine a periodic feature, and a random forest regression is used to predict the statistics for the database object for the next database maintenance window, using the history received at step 300. If the relational database maintenance program module 240 is unable to extract/determine a periodic feature, then the relational database maintenance program module 240 avoids predicting the statistics for the database object for the next database maintenance window, and the relational database maintenance program module 240 does not automatically maintain the database object.

Still referring to FIG. 3, at step 320, the relational database maintenance computer server 230 tests the workload using the predicted statistics. In embodiments, step 320 comprises the relational database maintenance program module 240 of the relational database maintenance computer server 230 testing the workload offline using the predicted statistics from step 310, which are used to determine updated access paths for the database objects. In embodiments, the relational database maintenance program module 240 tests the workload by saving a current access path for a database object, generating an updated access path for the database object based on the predicted statistics from step 310, and validating the updated access path (e.g., by switching the database object to use the updated access path and performing one or more test queries on the database object). If the updated access path cannot be validated, the relational database maintenance program module 240 switches the database object to use the saved access path.

Still referring to FIG. 3, at step 330, the relational database maintenance computer server 230 determines the database objects to be maintained. In embodiments, step 330 comprises the relational database maintenance program module 240 of the relational database maintenance computer server 230 determining the database objects to be maintained automatically by the relational database maintenance program module 240, based on the predicted statistics from step 310 and the workload testing from step 320. In particular, in embodiments, the relational database maintenance program module 240 determines the database objects to be maintained automatically to include the database objects for which the relational database maintenance program module 240 predicts statistics at step 310 and validates updated access paths at step 320.

Still referring to FIG. 3, at step 340, the relational database maintenance computer server 230 maintains the determined database objects. In embodiments, step 340 comprises the relational database maintenance program module 240 of the relational database maintenance computer server 230 automatically maintaining the database objects determined at step 330. In particular, in embodiments, the relational database maintenance program module 240 causes the RDBMS program module 220 in the RDBMS computer server 210 to switch the access paths in the determined database objects in the relational database 225 to the updated access paths determined offline at step 320, during the next maintenance window. In this manner, RUNSTATS and BIND cost is reduced as these commands do not need to be run during the maintenance window with respect to the determined database objects.

Still referring to FIG. 3, at step 350, the relational database maintenance computer server 230 modifies the statistics prediction based on feedback. In embodiments, step 350 comprises the relational database maintenance program module 240 of the relational database maintenance computer server 230, upon collecting new statistics (e.g., when a RUNSTATS command is next executed), comparing the new statistics with predicted statistics from step 310 to determine an accuracy of the predicted statistics. In embodiments, using machine learning techniques and the new statistics, the relational database maintenance program module 240 tunes the prediction model used at step 310 to improve accuracy of future predictions.

FIG. 4 illustrates test results 400 from an exemplary simulation for fullkeycard statistic prediction, and FIG. 5 illustrates test results 500 from an exemplary simulation for cluster ratio statistic prediction. In the example simulations, high2key and low2key of columns are not chosen. The test result table card, index firstkeycard, fullkeycard, and column card are similar (line), so index fullkeycard is used as an example. For the statistics as a curve, index cluster ratio is used. In the example simulations, TPCD is selected as a workload, and the simulations are performed for various table types, including static tables, constant growth tables, and volatile tables. A line regression method and a random forest regression method are used to predict the statistics, and the predicted statistics are scored against the actual statistics from the simulation. In the example simulations, a score over 0.95 indicates that a prediction is highly accurate, a score over 0.8 indicates that a prediction is somewhat accurate, and a score under 0.5 indicates that a prediction cannot be trusted.

Figure 6:
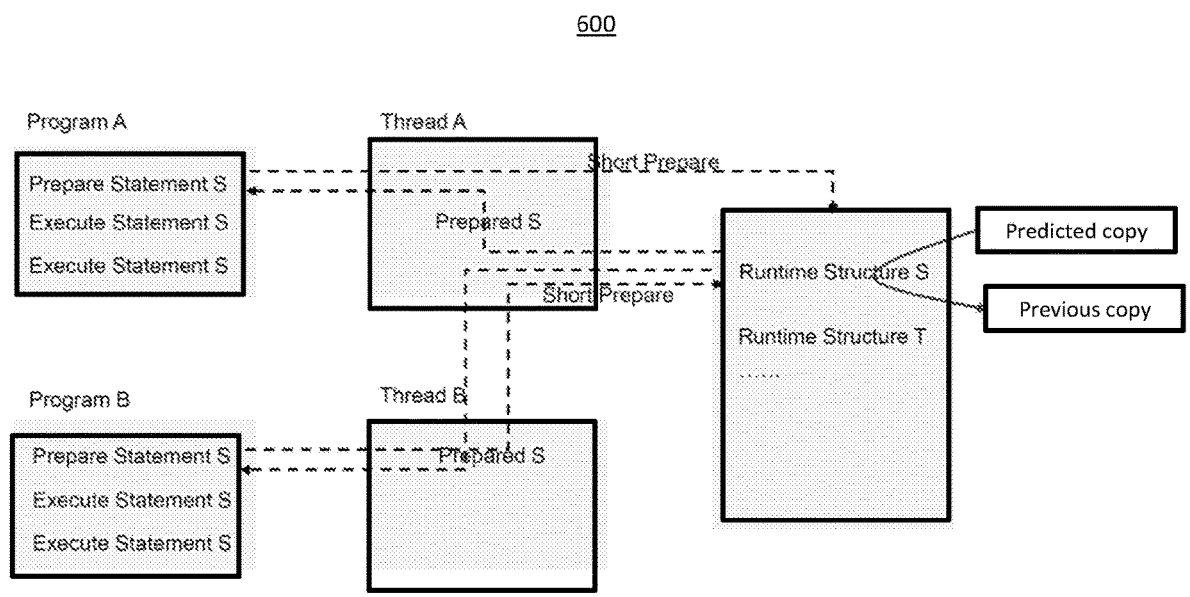
FIG. 6 illustrates processing of an exemplary dynamic query according to an embodiment.

FIG. 6 illustrates processing of an exemplary dynamic query 600 according to an embodiment. In the example of FIG. 6, in the case of a dynamic query, database objects including Runtime Structure S (a control structure or skeleton copy created the first time the dynamic query is executed) are maintained according to steps 300 to 350 of FIG. 3. During a database maintenance window, the previous copy of the Runtime Structure S is replaced with an updated (predicted) copy of Runtime Structure S with an updated access path, using the process described above with respect to FIG. 3. In this manner, prepared dynamic SQL is automatically maintained according to an embodiment.

Accordingly, it is understood from the foregoing description that embodiments of the invention provide a method to reduce a database maintain window. In embodiments, the database prepares the application and package in advance depending on the history information, and the database system switches to the prepared packages during the maintain window. In embodiments, the method includes: the database system analyzing the application to be maintained and collecting the statistics information for the database objects referred by the applications; a machine learning module making prediction in the maintain window depending on the history statistic information, using as the input the history statistics information, and providing as the output the predicted the statistic information; the database preparing the applications and packages depending on the predicted information, using as the input the predicted information, and providing as the output the prepared applications and packages; and during the maintain windows, the database system applying the prepared packages predicted, using as the input the prepared packages, and providing as the output applied package to reduce the maintain window.

In embodiments, a service provider could offer to perform the processes described herein. In this case, the service provider can create, maintain, deploy, support, etc., the computer infrastructure that performs the process steps of the invention for one or more customers. These customers may be, for example, any business that uses cloud computing technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   collecting, by a computing device, a history of statistics for database objects;
   predicting, by the computing device, a first maintenance window based on statistics for the database objects using the history of statistics for the database objects;
   testing, by the computing device, a workload using the predicted statistics for the database objects, comprising:
   saving a current access path of the database object, the current access path having a first processing cost;

generating an updated access path of the database object using the predicted statistics, the updated access path having a reduced processing cost; and validating the updated access path of the database object, wherein the reduced processing cost comprises a reduction from the first processing cost based on the updated access path of the database object;

determining, by the computing device, at least one database object to maintain based on the testing the workload; and maintaining, by the computing device, the determined at least one database object by performing at least one database maintenance task during a reduced maintenance window, wherein the reduced maintenance window comprises a reduction of the first maintenance window based on the determining the at least one database object to maintain.

2. The method according to claim 1, wherein the testing the workload is performed offline.

3. The method according to claim 1, wherein the determined at least one database object is determined based on the validating the updated access paths.

4. The method according to claim 1, wherein, for each database object of the determined at least one database object, maintaining the database object further comprises switching the current access path of the database object.

5. The method according to claim 1, wherein the predicted statistics correspond to a next maintenance window of a relational database.

6. The method according to claim 1, wherein the predicting the statistics is performed using a prediction model, and further comprising modifying the prediction model based on feedback received regarding the predicted statistics.

7. A computer program product, the computer program product comprising one or more computer readable storage media having program instructions collectively stored on the one or more computer readable storage media, the program instructions executable to:

collect a history of statistics for database objects;

predict statistics for the database objects corresponding to an upcoming database maintenance window using the history of statistics for the database objects;

determine an updated access path of a database object using the predicted statistics; and switch an access path of the database object to the updated access path at a reduced database maintenance window.

8. The computer program product according to claim 7, wherein the predicting the statistics comprises using a line regression method.

9. The computer program product according to claim 7, wherein the predicting the statistics comprises using a random forest regression method.

10. The computer program product according to claim 7, wherein the predicted statistics further comprise a fullkey-card statistic, and wherein the database objects comprise representations of information in a form as used in an object-oriented or object-oriented-compatible programming language.

11. The computer program product according to claim 7, wherein the switching the access path of the database object is performed in response to the updated access path being validated.

12. The computer program product according to claim 7, the program instructions further being executable to compare newly collected statistics with the predicted statistics to determine an accuracy of the predicted statistics.

13. A system comprising:

a hardware processor, a computer readable memory, and a computer readable storage medium associated with a computing device;

program instructions to collect a history of statistics for database objects;

program instructions to predict a first maintenance window based on statistics for the database objects using the history of statistics for the database objects, wherein the program instructions to predict the first maintenance window based on statistics for the database objects using the history of statistics for the database objects comprise program instructions to determine whether the database objects comprise constant growth tables or volatile tables;

program instructions to test a workload using the predicted statistics for the database objects, the test comprising:

saving a current access path of the database object, the current access path having a first processing cost;

generating an updated access path of the database objects using the predicted statistics, the updated access path having a reduced processing cost; and validating the updated access path of the database object, wherein the reduced processing cost comprises a reduction from the first processing cost based on the updated access path of the database object;

program instructions to determine at least one database object to maintain based on the testing the workload; and program instructions to maintain the determined at least one database object using at least one database maintenance task during a reduced maintenance window.

14. The system according to claim 13, wherein the testing the workload is performed offline.

15. The system according to claim 13, wherein the at least one database object is determined based on the validating the updated access paths.

16. The system according to claim 13, wherein, for each database object of the determined at least one database object, maintaining the database object further comprises switching the current access path of the database object to the updated access path of the database object.

17. The system according to claim 13, wherein the predicting the statistics is performed using a prediction model, and further comprising modifying the prediction model based on feedback received regarding the predicted statistics.

18. The method according to claim 1, wherein predicting the statistics for the database objects using the history of statistics for the database objects comprises:

predicting a cluster ratio statistic for the database objects using the history of statistics for the database objects.

* * * * *